United States Patent [19]

Hoffman et al.

[11] 4,302,362

[45] Nov. 24, 1981

[54] STABLE PYROCHLORE RESISTOR COMPOSITIONS

[75] Inventors: Lewis C. Hoffman, Hockessin, Del.; Samuel J. Horowitz, Synder, N.Y.

[73] Assignee: E. I. Du Pont de Nemours and Company, Wilmington, Del.

[21] Appl. No.: 5,719

[22] Filed: Jan. 23, 1979

[51] Int. Cl.$^3$ .............................................. H01B 1/06
[52] U.S. Cl. .................................... 252/520; 252/518; 252/521; 106/53; 106/73.4; 106/73.5; 106/1.05; 501/74; 501/153; 501/154; 501/152
[58] Field of Search ...................... 252/520, 518, 521; 106/53, 54, 57, 73.4, 73.5, 1.05

[56] References Cited

U.S. PATENT DOCUMENTS

| | | | |
|---|---|---|---|
| 3,583,931 | 6/1971 | Bouchard | 252/520 |
| 3,673,092 | 6/1972 | Dietz | 252/520 |
| 3,896,055 | 7/1975 | Bouchard et al. | 252/521 |
| 3,960,778 | 6/1976 | Bouchard et al. | 252/520 |

*Primary Examiner*—J. L. Barr

[57] ABSTRACT

Thick film resistors, based on pyrochlore conductive phase, glass, and refractory fillers having a thermal expansion coefficient range of $40 \times 10^{-7} - 60 \times 10^{-7}/°C$. and low solubility in the glass, are provided. Such thick film resistor pastes afford resistors having excellent stability to mechanical or thermal stresses.

20 Claims, No Drawings

STABLE PYROCHLORE RESISTOR COMPOSITIONS

DESCRIPTION

1. Technical Field

This invention relates to thick film filled resistor compositions and more particularly to thick film pyrochlore resistor compositions containing refractory fillers having a thermal expansion coefficient range of $40 \times 10^{-7} - 60 \times 10^{-7}/°C$.

2. Background Art

Conventional thick film resistors based on a pyrochlore conductive phase often show a slow upward drift in resistance values, on alumina substrates, when severely stressed. Such drift usually continues even after the stress is removed. The stress can be applied mechanically such as by scribing or indenting the film with a diamond pyramid or mechanical stress can result from the sudden changes in temperature occurring during the laser trimming of resistors. Slow increases in resistance of 1-2% are not uncommon and upward changes of 5% are sometimes encountered.

The above described changes are unpredictable in that in a given population of resistors some may show little or no change while others may drift 1% in 500 hours and still others may change as much as 5%. Such upward drift in resistance values and its unpredictability limit the utility of pyrochlore resistors to those applications where 1% or more end of life instability can be tolerated since it might not be possible to allow for such drift by aiming the trimmed resistance value at approximately 1% below the target value.

U.S. Pat. No. 3,816,348, issued June 11, 1974 to M. J. Popowich, discloses the use of additive oxides such as $Al_2O_3, SiO_2$ or their mixtures, to pyrochlore resistor compositions to reduce room temperature drift in resistivity. These additive oxides, because of their high and low, respectively, coefficients of thermal expansion, cannot provide the necessary resistance to the drift in resistivity of pyrochlore resistors.

U.S. Pat. No. 3,450,545, issued June 17, 1969 to K. H. Ballard, et al., discloses the addition of oxide precursors of the group consisting of rhodium, iridium, ruthenium, copper, and silicon to metallizing compositions to increase their joint strengths. The metallizing compositions are based on noble metals and inorganic binders. The oxide precursors, upon oxidation during firing, form an oxide coating on the metal particles to inhibit their sintering together. Such oxide precursors, however, do not afford the requisite stability in pyrochlore resistors.

U.S. Pat. No. 3,537,888, issued Nov. 3, 1970 to R. E. Schwyn, discloses the utilization of fine grained mullite power in metallizing ink compositions based on metals such as molybdenum and tungsten. The mullite increases the bond strength formed by the metallizing ink.

A paper by J. Francel, Solid State Technology, Feb. 20, 1977, discloses that addition of crystallite dopants to glasses increases their crack resistance. This is especially useful during laser trimming of thick film resistors containing glass. The generic class of crystallite dopants, however, does not solve the problem of resistance drift in pyrochlore resistors.

An article by F. Kummer, et al., International Conference on Thin and Thick Film Technology, September, 1977, Augsbury, Germany, pages 28-33, provides a theoretical framework in attempting to design thick film resistors with improved stability after laser trimming. The authors suggest that the coefficient of thermal expansion of the resistor should be equal to or slightly less than that of the substrate to reduce tensile stress. This, however, is achieved by the authors by varying the ratios of the disclosed $BaRuO_3$-lead borosilicate glass without the use of additional fillers and, again, does not afford the requisite stability for the pyrochlore resistors.

DISCLOSURE OF THE INVENTION

The thick film resistor compositions of this invention consist essentially of:

(A) 20-75 parts by weight, based on the weight of (A) plus (B) plus (C), of a conductive pyrochlore having the general formula

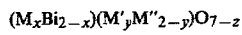

wherein
M is selected from the group consisting of yttrium, thallium, indium, cadmium, lead, copper and the rare earth metals;
M' is selected from the group consisting of platinum, titanium, chromium, rhodium and antimony;
M" is ruthenium, iridium or mixtures thereof;
x is 0-2 with the proviso that, for monovalent copper, $x \leq 1$;
y is 0-0.5 with the proviso that y is 0-1 when M' is either rhodium or more than one of platinum, titanium, chromium, rhodium and antimony; and
z is 0-1 with the proviso that it is at least equal to approximately x/2 when M is divalent lead or cadmium;

(B) 12-75 parts by weight, based on the weight of (A) plus (B) plus (C), of a glass binder having a coefficient of thermal expansion range of approximately $50-90 \times 10^{-7}/°C$. and a coalescence temperature range of approximately 540°-950° C.;

(C) 2-30 parts by weight, based on the weight of (A) plus (B) plus (C), of a refractory finely divided filler having a low solution rate in the glass binder, a coefficient of thermal expansion range of approximately $40-60 \times 10^{-7}/°C$. and a particle size range of 0.1-3 nm with at least 90% by weight in the 0.3-1 nm range; and (D) an organic vehicle wherein the ratio of (A) plus (B) plus (C) to the vehicle is in the range of 2:1 to 6:1 by weight.

Further improvement in stability at high temperature storage, such as at 200° C., can be achieved by presintering portions or all of the pyrochlore, the glass binder, and the refractory filler in various combinations with each other.

DESCRIPTION OF THE INVENTION

The precious metal pyrochlore phase of the resistor compositions of this invention imparts conductivity, sinterability and stability to these compositions and comprises 20-75 parts by weight, based on the combined inorganic solids, of the compositions. The inorganic solids content is made up of the pyrochlore, glass binder, and refractory filler.

These pyrochlores are polynary compounds of $Ru^{+4}$, $Ir^{+4}$ or mixtures thereof (M"), having the general formula:

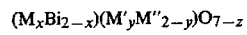

wherein
M is selected from the group consisting of yttrium, thallium, indium, cadmium, lead, copper and the rare earth metals;
M' is selected from the group consisting of platinum, titanium, chromium, rhodium and antimony;
M" is ruthenium, iridium or mixtures thereof;
x is 0–2 with the proviso that, for monovalent copper, $x \leq 1$;
y is 0–0.5 with the proviso that y is 0–1 when M' is either rhodium or more than one of platinum, titanium, chromium, rhodium and antimony; and
z is 0–1 with the proviso that it is at least equal to approximately x/2 when M is divalent lead or cadmium.

These pyrochlore materials have been described in detail in R. J. Bouchard, U.S. Pat. No. 3,583,931, issued June 8, 1971, hereby incorporated by reference.

Preferred among the pyrochlores are bismuth ruthenate, $Bi_2Ru_2O_7$, which is readily obtained in a pure form, is not adversely affected by the glass binder, has a low resistivity which is relatively invariant with temperature, is stable when heated in air to about 1000° C., and is relatively stable in reducing atmospheres and lead ruthenate, $Pb_2Ru_2O_6$. Among other pyrochlores are included $Pb_{1.5}Bi_{0.5}Ru_2O_{6.25}$ and $GdBiRu_2O_{6.5}$. For all of these, y=0.

The conductive pyrochlore is present in the inventive composition to the extent of 20–75 parts by weight, and preferably 23–70 parts, of the combined inorganic solids content of the compositions.

The composition of this invention also contains 12–75, and preferably 28–65, parts by weight of the combined inorganic solids of a glass binder.

A wide variety of glass binders can be utilized which meet the dual requirements of having a coefficient of thermal expansion range of approximately $50 \times 10^{-7}$–$90 \times 10^{-7}$/°C. and a coalescence temperature range of approximately 540°–950° C. The preferred range for the former is $55$–$80 \times 10^{-7}$/°C. and for the latter is 750°–925° C. An especially preferred coalescence (maturing) temperature is approximately 850° C.

The composition of glass binder is governed, to some extent, by the necessity of properly matching the alumina ceramic substrates utilized. For example, the low end of the binder coalescence temperature range, approximately 540°–550° C., is required for a porcelainized steel substrate. Since there is a need for the glass binders to have expansion/contraction characteristics similar to those of the substrate, and since a commonly utilized substrate, 96% alumina ceramic, has a thermal expansion coefficient of $75 \times 10^{-7}$/°C., the above $50$–$90 \times 10^{-7}$/°C. coefficient range for the binders is necessitated.

Lead silicate glass binders, with an $SiO_2$ content of approximately 23–34 weight %, fulfill the above requirements. Silica levels below approximately 24% yield glass binders with higher thermal expansion coefficients. These have a tendency to crystallize thereby limiting the upper end of the maturing temperature range. Higher silica levels, above 35%, tend to prevent complete maturing of the glass at the lower end of the firing range.

Lead borosilicate glass binders, containing approximately 23–34 weight % of silica, approximately 52–73 weight % of PbO, and approximately 4–14% by weight of $B_2O_3$ can also be utilized. These limitations are important since lower levels of silica, higher levels of PbO or higher levels of $B_2O_3$ can lead to crystallization of quartz, a filler having a detrimentally high thermal expansion coefficient. Higher levels of silica or lower levels of PbO can prevent proper maturing of the glass binders while lower levels of $B_2O_3$ in the binder increase viscosity leading to insufficient coalescence in firing.

The introduction of small amounts of oxides of lithium, potassium or sodium into lead borosilicate glass binders can be desirable in the development of resistor microstructure. However, for these particular glasses, use of the above oxides other than lithium can lead to thermal expansion coefficients above the preferred $80 \times 10^{-7}$/°C. Lithium oxide can be beneficially included among the components of the glass binder to the extent of about 3% by weight. In addition to the salutary effects on resistor microstructure development, the presence of $Li_2O$ permits the introduction of small quantities of $ZrO_2$ and/or $TiO_2$ into the binder. Up to approximately 4% $ZrO_2$ enhances the resistance of the glass to solubility in alkaline solutions while $TiO_2$ enhances the resistance of glass to attack by acids.

When the glass binder is a PbO free zinc alumino-borosilicate glass, it can also contain $Na_2O$ and still not exceed the preferred thermal expansion coefficient range. An example of such a binder is shown in Tables I and II below, number 3.

Tables I and II below summarize the representative examples of glass binder compositions which can be utilized in the resistors of this invention. Among these, glass numbers 1, 2, 4, 5, and 10 are preferred. Additional glasses advantageously utilized are shown in the Examples.

TABLE I

| | Glass Binders (% by weight) | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 28.8 | 29.0 | 23.5 | 25.9 | 34.0 | 29.6 | 26.0 | 25.0 | 24.0 | 24.0 | 33.5 |
| $ZrO_2$ | | | 4.0 | | | | | 4.0 | 4.0 | 2.0 | |
| $TiO_2$ | | | | | | | | | 4.0 | | |
| $B_2O_3$ | | | 25.4 | 10.0 | | | 10.0 | 10.0 | 10.0 | 10.0 | 3.1 |
| $Al_2O_3$ | | | 6.4 | 2.5 | 1.0 | 4.0 | 2.5 | 1.0 | 2.5 | 2.5 | 1.2 |
| PbO | 71.2 | 69.0 | | 61.6 | 65.0 | 63.3 | 59.0 | 57.5 | 53.5 | 58.5 | 62.2 |
| CdO | | | | | | 3.1 | | | | | |
| BaO | | | 1.0 | | | | | | | | |
| CaO | | | 4.0 | | | | | | | | |
| ZnO | | | 27.2 | | | | | | | | |
| $Li_2O$ | | 2.0 | | | | | | 2.0 | 2.0 | 2.0 | 3.0 |
| $Na_2O$ | | | 8.5 | | | | | | | | |

TABLE II

| | Glass Binders (mole %) | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 60.0 | 56.2 | 28.0 | 49.3 | 65.4 | 58.7 | 46.4 | 45.0 | 41.8 | 42.3 | 62.5 |
| $ZrO_2$ | | | 2.4 | | | | | 3.6 | 3.5 | 1.7 | |
| $TiO_2$ | | | | | | | | 5.2 | | | |
| $B_2O_3$ | | | 25.9 | 16.3 | | | 15.3 | 15.4 | 14.9 | 15.1 | 4.9 |
| $Al_2O_3$ | | | 4.4 | 2.9 | 1.0 | 4.6 | 2.7 | 1.0 | 2.6 | 2.6 | 1.3 |
| PbO | 40.0 | 36.0 | | 31.5 | 33.6 | 33.8 | 28.4 | 27.8 | 25.0 | 27.7 | 31.3 |
| CdO | | | | | | 2.9 | | | | | |
| BaO | | | 0.5 | | | | | | | | |
| CaO | | | 5.1 | | | | | | | | |
| ZnO | | | 24.0 | | | | | | | | |
| $Li_2O$ | | 7.8 | | | | | 7.2 | 7.2 | 7.0 | 10.6 | |
| $Na_2O$ | | | 9.7 | | | | | | | | |

The selection process for glass binders necessitated by the above-described factors, however, leads to a mismatch of thermal expansion coefficients between glass binder and the pyrochlore conductive phase. As was stated above, the coefficient of thermal expansion of the glass binder is in the $50-90 \times 10^{-7}/°C$. range, and preferably in the $55-80 \times 10^{-7}/°C$. range. Representative expansion coefficients, $\alpha$, for some of the pyrochlores are shown below:

| Pyrochlore | $\alpha$ (/°C.) |
|---|---|
| $Bi_2Ru_2O_7$ | $120 \times 10^{-7}$ |
| $Pb_{1.5}Bi_{0.5}Ru_2O_{6.25}$ | $97 \times 10^{-7}$ |
| $Pb_2Ru_2O_6$ | $95 \times 10^{-7}$ |
| $Cu_{0.4}Er_{0.2}Cd_{0.1}Bi_{1.3}Ru_2O_{6.5}$ | $89 \times 10^{-7}$ |
| $CuBiRu_2O_6$ | $88 \times 10^{-7}$ |
| $Gd_{1.23}Bi_{0.77}Ru_2O_7$ | $81 \times 10^{-7}$ |

Such a disparity results in excessive shrinkage during cooling of the pyrochlore when compared to the binder, giving rise to tensile stresses in the fired resistors. A solution to this problem has been now found in the present invention through the introduction of refractory fillers to be discussed below.

It has been found that small amounts of a glass binder, approximately 5% or less of the total glass binder, can be replaced by others not meeting the claimed limits without deleterious affects on film properties. The introduction of such glasses can be sometimes desirable to control the temperature coefficient of resistance (TCR).

Since it is known that CdO has desirable effects on the TCR of resistors containing bismuth or lead ruthenium pyrochlore oxides, i.e., it acts as a negative TCR driver, it can be introduced into the compositions of this invention by adding CdO-containing glass binders along with the claimed binder. Examples 14, 15, and 16 illustrate such a method utilizing a glass having the following composition (weight %): $Na_2O$ (7.1), CdO (60.2), $Al_2O_3$ (2.3), $B_2O_3$ (15.9), $SiO_2$ (14.5). Incorporation of low levels of this glass provides sufficient CdO to exert its beneficial effects on TCR without much loss of resistance to changes in resistivity of the films upon stress. $MnO_2$-containing glass binders can also be introduced into the resistor composition to act as TCR drivers.

The glass binders are prepared by conventional glass-making techniques, by mixing the desired components (or precursors thereof, e.g., $H_3BO_3$ for $B_2O_3$) in the desired proportions and heating the mixture to form a melt. As is well known in the art, heating is conducted to a peak temperature and for a time such that the melt becomes entirely liquid, yet gaseous evolution has ceased. In this work, the peak temperature is in the range 1100°–1500° C., usually 1200°–1400° C. The melt is then quenched by cooling the melt, typically by pouring onto a cold belt or into cold running water. Particle size reduction can then be accomplished by milling as desired.

More specifically, the glasses utilized herein can be prepared by melting in platinum crucibles in electrically heated silicon carbide furnaces at approximately 1200°–1400° C. for a period of 20 minutes to one hour. Final particle size (surface area) of 1–4 meter$^2$/gram can be obtained by rotatory or vibratory miling. (Vibratory milling is carried out in an aqueous medium by placing inorganic powders and alumina cylinders into a container which is then vibrated for a specified length of time.)

The pyrochlore resistor compositions of this invention also contain 2–30 parts by weight, based on the weight of (A) plus (B) plus (C), of a refractory finely divided filler having a low solution rate in the glass binder, a coefficient of thermal expansion range of approximately $40-60 \times 10^{-7}/°C$. and a particle size range of 0.1–3 nm with at least 90% by weight in the 0.3–1 nm range.

The presence of this refractory filler unexpectedly results in reducing the tensile stresses referred to above in the glass binder phase of the pyrochlore/glass resistors.

The mechanism of such stress reduction is not known for certain but it is believed that the introduction of discrete particles, having thermal expansion coefficients lower than the glass binder, high elastic moduli, and being relatively insoluble in the glass under firing conditions, exert during cooling the opposite kind of stress on the glass from that caused by the pyrochlore.

It is important that the filler meets the above thermal expansion coefficient limits. When fillers having coefficients above $60 \times 10^{-7}/°C$., e.g., $ZrO_2$ ($\alpha = 75 \times 10^{-7}/°C$.), were utilized in resistor compositions based on $Bi_2Ru_2O_7$ and the glass binder (number 1 in Table I), the fired films were weaker than the unfilled films as determined by diamond scribing or thermal shock testing.

When, on the other hand, fillers having coefficients below $40 \times 10^{-7}/°C$., e.g., zinc zirconium silicate ($\alpha = 38 \times 10^{-7}/°C$.) and Pyrex glass ($\alpha = 32 \times 10^{-7}/°C$.), were utilized in the above resistor systems, the fired films were also weaker than the unfilled films.

It is also important that the filler be finely divided and be present in sufficient quantities to achieve full compression of the glass regions between the filler particles. The effective particle size range for the refractory filler is 0.1–3 nm with at least 90% by weight in the 0.3–1 nm range. Preferably, for zircon, the average particle size is approximately 0.5 nm. This size restriction is thought to be related to the necessity that the compressive stress in the glass, which is at a maximum at the glass/filler interface, not reach zero as the distance from the interface increases before the stress field from another filler particle.

The zircon filler utilized in several Examples has a surface area of 14.4 meters$^2$/gram and a weight average particle size of 0.7 nm. The mullite filler utilized in several Examples has a surface area of 6.9 meters$^2$/gram and a weight average particle size of approximately 0.4 nm.

Furthermore, it is thought that high solubility rates of the filler particles in the glass are undesirable. This is believed to be the case since only separate phase particles can exert the necessary compressive effect on the system.

Effective filler particle concentration is 2–30 parts by weight of the combined inorganic solids content of the composition. Optimum filler concentration for maximum compressive forces is 20–30 parts by weight. To avoid surface roughness of the fired films, especially when large amounts of pyrochlore are present, the presence of 10–20 parts of filler is preferred.

Effective filler concentration levels are influenced by filler particle size but, in general, levels of 10–20 parts by weight are most advantageous, especially when the filler particles are in the 0.4–0.7 nm range. When zircon was utilized as the filler, with a weight average particle size of approximately 0.2 nm, optimum filler level was approximately 20 parts by weight. Below two parts by weight of filler no noticeable effects on resistor properties were found.

Among the fillers utilized in the thick film resistor compositions of this invention, the following two are preferred: zircon, $ZrSiO_4$, having a thermal expansion coefficient of $46 \times 10^{-7}$/°C., and mullite, $Al_6Si_4O_{13}$, having a thermal expansion coefficient of $56 \times 10^{-7}$/°C.

It has been found that approximately 50% or less of the presently claimed refractory fillers can be replaced by others not meeting the claimed limits without unacceptable loss of properties. Among such fillers are beta-spodumene, $LiAlSi_2O_6$ ($\alpha = 10 \times 10^{-7}$/°C.), see Examples 28 and 29.

Further improvements in stability of high temperature storage can be achieved by presintering portions or all of the pyrochlore, glass binder, and the refractory filler in various combinations with each other. A preferred way of carrying out the presintering is to prepare a so-called presintered functional phase intermediate by calcining a pyrochlore such as lead ruthenate and a glass and to prepare a so-called presintered filler phase intermediate by calcining a refractory filler such as zircon and a glass. These intermediates can then be combined and can be the inorganic solids content of the resistor composition of this invention.

The inorganic solids content of the resistor compositions of this invention are dispersed in an organic vehicle to form printable composition pastes. The ratio of the inorganics to the vehicle is in the range of from 2:1 to 6:1 by weight.

Any inert liquid can be used as the vehicle. Water or any one of various organic liquids, with or without thickening and/or stabilizing agents and/or other common additives, can be used as the vehicle. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethyl cellulose, in solvents such as pine oil and the monobutyl ether of ethylene glycol monoacetate. The vehicle can contain or be composed of volatile liquids to promote fast setting after application to the substrate.

A preferred vehicle is based on ethyl cellulose and beta-terpineol. The pastes are conveniently prepared on a three-roll mill.

The resistor compositions can be printed as a film onto ceramic, alumina or other dielectric substrates in the conventional manner. Advantageously, alumina substrate is utilized and the compositions are printed on prefired palladium-silver terminations.

Generally, screen stenciling techniques are preferably employed. The resulting printed patterns are generally allowed to level out, dried at elevated temperatures such as at 120° C. for approximately 10 minutes, and fired in air in a belt furnace at a peak temperature of approximately 850° C.

Resistance measurements can be carried out by probing the termination pattern with an autoranging, autobalancing digital ohmmeter of 0.01% precision. Most tests are carried out on 1 millimeter square test patterns.

Thermal shock can be determined by measuring the permanent change in resistance caused by six cycles from a hot plate at 275° C. to an aluminum plate at room temperature.

Diamond scribing can be carried out with a 60° conical diamond while resistance is measured by an ohmmeter through a pair of tungsten probes and while the resistor is observed through a stereo microscope. A cut is made through one-half of the width of the resistor, and resistance readings are recorded until equilibrium is achieved.

Laser trimming can be carried out with an yttrium aluminum garnet (YAG) pulsed laser. The laser is attached to a computer able to read the resistance 50 milliseconds after 2X trimming of 40 mil by 40 mil (approx. 1 mm × 1 mm) resistors and at suitable intervals thereafter, such as 48,100,200 hours, up to 500 hours. Storage conditions can be room temperature, 40° C./85% relative humidity, 50° C. or 200° C.

Solder dipping stability can be measured as the permanent change in resistance after one or two immersions into solder (Sn/Pb/Ag//62/36/2, by weight) at 215° C. Examples 1, 3–16, and 28–31 utilized two immersions, all others one.

In the Examples below, illustrating the invention, except for Example 32 which compares a resistor composition without the claimed refractory filler to the resistor compositions of this invention, all parts are by weight unless otherwise indicated.

EXAMPLES 1–31

The resistor compositions in Examples 1–32 are prepared similarly. For illustration, details are shown for Examples 10 and 19.

Example 10. The most preferred composition containing $Bi_2Ru_2O_7$ pyrochlore, a preferred pyrochlore, contains glass binder number 1 (Tables I and II) and a preferred filler, zircon (see Table IV for composition). In addition, the composition contains combined with the above inorganic solids, an organic vehicle in the weight ratio of solids/vehicle//75/25.

The glass binder is prepared by melting the components as shown in Table III for binder number 1 at 1200° C. for approximately 30 minutes (or until all gas evolution ceases), quenched in water, and milled to a surface area of approximately 4 meters²/gram.

The zircon filler has a surface area of 14.4 meters²/gram and a weight average particle size of 0.7 nm with 90% of the particles between 0.2 nm-3 nm.

The vehicle is ethyl cellulose, 13.0 parts (having 49% by weight ethoxyl content and a solution viscosity of 50 centipoises as determined as a 5% by weight solution in 80/20 by weight mixture of toluene/ethanol after drying at 100° C. for 30 minutes), di-butyl carbitol, 43.0 parts, and β-terpineol, 44.0 parts.

The composition is printed and the resulting patterns are fired to provide a resistor of this invention with its properties shown in Table IV.

Example 19. The most preferred composition containing $Pb_2Ru_2O_6$ pyrochlore, a preferred pyrochlore, contains glass binder number 1 and zircon. In addition, the composition contains an organic vehicle as shown in Example 10. The $Pb_2Ru_2O_6$ is prepared from PbO and Ru metal by reaction at 850° C. in air followed by comminution to a surface area of approximately 4 meters²/gram. Resistor composition and fired properties are shown in Table IV.

The glass binders utilized in Examples 1-31 are prepared from the compounds listed in Table III resulting in the compositions shown in Tables I and II.

TABLE III

| | Glass Binder Batch Compositions (% by weight) | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$, Flint | 28.8 | 29.0 | 17.7 | 23.7 | 33.8 | 29.0 | 22.7 | 22.6 | 21.4 | 21.2 | 32.5 |
| $ZrO_2$, Opax | | | 3.0 | | | | 3.6 | 3.6 | | 1.8 | |
| $TiO_2$, Anatase | | | | | | | | | 3.6 | | |
| $B(OH)_3$ | | | 34.1 | 16.3 | | | 15.5 | 16.1 | 15.9 | 15.7 | 5.3 |
| $Al_2O_3 \cdot 3H_2O$ | | | 7.4 | 3.5 | 1.5 | 6.0 | 5.9 | 1.4 | 3.4 | 3.3 | 1.8 |
| PbO, Litharge | 71.2 | 69.0 | | 56.5 | 64.7 | 62.0 | 51.5 | 51.8 | 47.6 | 51.5 | 60.4 |
| CdO | | | | | | 3.0 | | | | | |
| BaO | | | 1.0 | | | | | | | | |
| $CaCO_3$ | | | 5.4 | | | | | | | | |
| $ZnO_2$ | | | 20.5 | | | | | | | | |
| $Li_2CO_3$ | | 4.8 | | | | | 4.4 | 4.5 | 4.5 | 6.5 | |
| $Na_2CO_3$ | | | 10.9 | | | | | | | | |

Table IV lists the resistor compositions and final (fired) film properties.

TABLE IV

| | Example | | |
|---|---|---|---|
| | 1 | 2 | 3 |
| Glass Binder | | | |
| No. 1 | 63 | 61.4 | 60 |
| No. 2 | | | |
| No. 3 | | | |
| No. 4 | | | |
| No. 5 | | | |
| No. 6 | | | |
| No. 7 | | | |
| No. 8 | | | |
| No. 9 | | | |
| No. 10 | | | |
| No. 11 | | | |
| Pyrochlore | | | |
| $Bi_2Ru_2O_7$ | 35 | 23.6 | 35 |
| $Pb_2Ru_2O_6$ | | | |
| $Pb_{1.5}Bi_{0.5}Ru_2O_{6.25}$ | | | |

TABLE IV-continued

| | | | |
|---|---|---|---|
| $Gd_{1.23}Bi_{0.77}Ru_2O_7$ | | | |
| $Cu_{0.4}Er_{0.2}Cd_{0.1}Bi_{1.3}Ru_2O_{6.55}$ | | | |
| Fillers | | | |
| Spodumene | | | |
| Zircon | 2 | 15 | 5 |
| Mullite | | | |
| Properties | | | |
| Resistivity, kΩ/sq. | 0.710 | 107 | 0.870 |
| Stability, thermal shock[2] | +0.08 | | +0.07 |
| Stability, dia. scribe[3] | Avg. | Exc. | Good |
| Stability, laser scribe[4] | | +0.08 | |
| Stability, solder dipping[5] | | — | |

| | Example | | |
|---|---|---|---|
| | 4 | 5 | 6 |
| Glass Binder | | | |
| No. 1 | | | |
| No. 2 | 60 | | |
| No. 3 | | 60 | |
| No. 4 | | | 60 |
| No. 5 | | | |
| No. 6 | | | |
| No. 7 | | | |
| No. 8 | | | |
| No. 9 | | | |
| No. 10 | | | |
| No. 11 | | | |
| Pyrochlore | | | |
| $Bi_2Ru_2O_7$ | 25 | 25 | 25 |
| $Pb_2Ru_2O_6$ | | | |
| $Pb_{1.5}Bi_{0.5}Ru_2O_{6.25}$ | | | |
| $Gd_{1.23}Bi_{0.77}Ru_2O_7$ | | | |
| $Cu_{0.4}Er_{0.2}Cd_{0.1}Bi_{1.3}Ru_2O_{6.55}$ | | | |
| Fillers | | | |
| Spodumene | | | |
| Zircon | 15 | 15 | 15 |
| Mullite | | | |
| Properties | | | |
| Resistivity, kΩ/sq. | 16.165 | 11.6 | 322.080 |
| Stability, thermal shock[2] | +0.03 | +0.04 | +0.03 |
| Stability, dia. scribe[3] | Avg. | Avg. | Exc. |
| Stability, laser scribe[4] | | | |
| Stability, solder dipping[5] | | | +0.02 |

| | Example | | |
|---|---|---|---|
| | 7 | 8 | 9 |
| Glass Binder | | | |
| No. 1 | | | |
| No. 2 | | | |
| No. 3 | | | |
| No. 4 | | | |
| No. 5 | | | |
| No. 6 | | | |
| No. 7 | 60 | | |
| No. 8 | | 60 | |
| No. 9 | | | 60 |

TABLE IV-continued

| | | | |
|---|---|---|---|
| No. 10 | | | |
| No. 11 | | | |
| Pyrochlore | | | |
| $Bi_2Ru_2O_7$ | 25 | 25 | 25 |
| $Pb_2Ru_2O_6$ | | | |
| $Pb_{1.5}Bi_{0.5}Ru_2O_{6.25}$ | | | |
| $Gd_{1.23}Bi_{0.77}Ru_2O_7$ | | | |
| $Cu_{0.4}Er_{0.2}Cd_{0.1}Bi_{1.3}Ru_2O_{6.55}$ | | | |
| Fillers | | | |
| Spodumene | | | |
| Zircon | 15 | 15 | 15 |
| Mullite | | | |
| Properties | | | |
| Resistivity, kΩ/sq. | 12.970 | 190 | 16.005 |
| Stability, thermal shock[2] | +0.02 | +0.09 | +0.08 |
| Stability, dia. scribe[3] | Exc. | Avg. | Avg. |
| Stability, laser scribe[4] | | | |
| Stability, solder dipping[5] | | | |

| | Example | | |
|---|---|---|---|
| | 10 | 11 | 12 |
| Glass Binder | | | |
| No. 1 | 59.5 | 55 | 50 |
| No. 2 | | | |
| No. 3 | | | |
| No. 4 | | | |
| No. 5 | | | |
| No. 6 | | | |
| No. 7 | | | |
| No. 8 | | | |
| No. 9 | | | |
| No. 10 | | | |
| No. 11 | | | |
| Pyrochlore | | | |
| $Bi_2Ru_2O_7$ | 25.5 | 35 | 25 |
| $Pb_2Ru_2O_6$ | | | |
| $Pb_{1.5}Bi_{0.5}Ru_2O_{6.25}$ | | | |
| $Gd_{1.23}Bi_{0.77}Ru_2O_7$ | | | |
| $Cu_{0.4}Er_{0.2}Cd_{0.1}Bi_{1.3}Ru_2O_{6.55}$ | | | |
| Fillers | | | |
| Spodumene | | | |
| Zircon | 15 | 10 | 25 |
| Mullite | | | |
| Properties | | | |
| Resistivity, kΩ/sq. | 106 | 0.775 | 15.5 |
| Stability, thermal shock[2] | +0.02 | +0.05 | +0.05 |
| Stability, dia. scribe[3] | Exc. | Exc. | Exc. |
| Stability, laser scribe[4] | +0.06 | | |
| Stability, solder dipping[5] | +0.01 | | |

| | Example | | |
|---|---|---|---|
| | 13 | 14[1] | 15[1] |
| Glass Binder | | | |
| No. 1 | 15 | 54.5 | 43.5 |
| No. 2 | | | |
| No. 3 | | | |
| No. 4 | | | |
| No. 5 | | | |
| No. 6 | | | |
| No. 7 | | | |
| No. 8 | | | |
| No. 9 | | | |
| No. 10 | | | |
| No. 11 | | | |
| Pyrochlore | | | |
| $Bi_2Ru_2O_7$ | 70 | 29 | 40 |
| $Pb_2Ru_2O_6$ | | | |
| $Pb_{1.5}Bi_{0.5}Ru_2O_{6.25}$ | | | |
| $Gd_{1.23}Bi_{0.77}Ru_2O_7$ | | | |
| $Cu_{0.4}Er_{0.2}Cd_{0.1}Bi_{1.3}Ru_2O_{6.55}$ | | | |
| Fillers | | | |
| Spodumene | | | |
| Zircon | 15 | 15 | 15 |
| Mullite | | | |
| Properties | | | |
| Resistivity, kΩ/sq. | 0.011 | 9 | 0.900 |
| Stability, thermal shock[2] | | | |
| Stability, dia. scribe[3] | Avg. | Exc. | Exc. |
| Stability, laser scribe[4] | | | |
| Stability, solder dipping[5] | +0.05 | +0.2 | +0.05 |

| | Example | | |
|---|---|---|---|
| | 16[1] | 17 | 18 |
| Glass Binder | | | |
| No. 1 | 33.5 | 67.8 | 65 |
| No. 2 | | | |
| No. 3 | | | |
| No. 4 | | | |
| No. 5 | | | |
| No. 6 | | | |
| No. 7 | | | |
| No. 8 | | | |
| No. 9 | | | |
| No. 10 | | | |
| No. 11 | | | |
| Pyrochlore | | | |
| $Bi_2Ru_2O_7$ | 50 | | |
| $Pb_2Ru_2O_6$ | | 24.7 | 25.0 |
| $Pb_{1.5}Bi_{0.5}Ru_2O_{6.25}$ | | | |
| $Gd_{1.23}Bi_{0.77}Ru_2O_7$ | | | |
| $Cu_{0.4}Er_{0.2}Cd_{0.1}Bi_{1.3}Ru_2O_{6.55}$ | | | |
| Fillers | | | |
| Spodumene | | | |
| Zircon | 15 | 7.5 | 10.0 |
| Mullite | | | |
| Properties | | | |
| Resistivity, kΩ/sq. | 0.100 | 78.5 | 94.6 |
| Stability, thermal shock[2] | | | |
| Stability, dia. scribe[3] | Avg. | | |
| Stability, laser scribe[4] | | +0.08 | +0.09 |
| Stability, solder dipping[5] | +0.05 | +0.08 | +0.19 |

| | Example | | |
|---|---|---|---|
| | 19 | 20 | 21 |
| Glass Binder | | | |
| No. 1 | 59.6 | 59.6 | 59.6 |
| No. 2 | | | |
| No. 3 | | | |
| No. 4 | | | |
| No. 5 | | | |
| No. 6 | | | |
| No. 7 | | | |
| No. 8 | | | |
| No. 9 | | | |
| No. 10 | | | |
| No. 11 | | | |
| Pyrochlore | | | |
| $Bi_2Ru_2O_7$ | | | |
| $Pb_2Ru_2O_6$ | 25.4 | | |
| $Pb_{1.5}Bi_{0.5}Ru_2O_{6.25}$ | | 25.4 | |
| $Gd_{1.23}Bi_{0.77}Ru_2O_7$ | | | 25.4 |
| $Cu_{0.4}Er_{0.2}Cd_{0.1}Bi_{1.3}Ru_2O_{6.55}$ | | | |
| Fillers | | | |
| Spodumene | | | |
| Zircon | 15.0 | 15.0 | 15.0 |
| Mullite | | | |
| Properties | | | |
| Resistivity, kΩ/sq. | 90.2 | 178.4 | 368 |
| Stability, thermal shock[2] | | | |
| Stability, dia. scribe[3] | | | |
| Stability, laser scribe[4] | +0.06 | +0.09 | +0.21 |
| Stability, solder dipping[5] | +0.14 | +0.18 | +0.27 |

| | Example | | |
|---|---|---|---|
| | 22 | 23 | 24 |
| Glass Binder | | | |
| No. 1 | | | 52.9 |
| No. 2 | | | |
| No. 3 | | | |
| No. 4 | 58.1 | | |
| No. 5 | | 58.1 | |
| No. 6 | | | |
| No. 7 | | | |
| No. 8 | | | |
| No. 9 | | | |
| No. 10 | | | |
| No. 11 | | | |
| Pyrochlore | | | |

TABLE IV-continued

|  | 22 | 23 | 24 |
|---|---|---|---|
| $Bi_2Ru_2O_7$ |  |  |  |
| $Pb_2Ru_2O_6$ | 26.9 | 26.9 | 27.1 |
| $Pb_{1.5}Bi_{0.5}Ru_2O_{6.25}$ |  |  |  |
| $Gd_{1.23}Bi_{0.77}Ru_2O_7$ |  |  |  |
| $Cu_{0.4}Er_{0.2}Cd_{0.1}Bi_{1.3}Ru_2O_{6.55}$ |  |  |  |
| Fillers |  |  |  |
| Spodumene |  |  |  |
| Zircon | 15.0 | 15.0 | 20.0 |
| Mullite |  |  |  |
| Properties |  |  |  |
| Resistivity, k$\Omega$/sq. | 119.4 | 171.9 | 105.7 |
| Stability, thermal shock[2] |  |  |  |
| Stability, dia. scribe[3] |  |  |  |
| Stability, laser scribe[4] | +0.14 | +0.07 | +0.06 |
| Stability, solder dipping[5] | — | +0.13 | +0.06 |

| Example | 25 | 26 | 27 |
|---|---|---|---|
| Glass Binder |  |  |  |
| No. 1 | 52.1 |  | 47.4 |
| No. 2 |  |  |  |
| No. 3 |  |  |  |
| No. 4 |  |  |  |
| No. 5 |  | 49.3 |  |
| No. 6 |  |  |  |
| No. 7 |  |  |  |
| No. 8 |  |  |  |
| No. 9 |  |  |  |
| No. 10 |  |  |  |
| No. 11 |  |  |  |
| Pyrochlore |  |  |  |
| $Bi_2Ru_2O_7$ |  |  |  |
| $Pb_2Ru_2O_6$ |  | 35.7 | 28.3 |
| $Pb_{1.5}Bi_{0.5}Ru_2O_{6.25}$ |  |  |  |
| $Gd_{1.23}Bi_{0.77}Ru_2O_7$ |  |  |  |
| $Cu_{0.4}Er_{0.2}Cd_{0.1}Bi_{1.3}Ru_2O_{6.55}$ | 32.9 |  |  |
| Fillers |  |  |  |
| Spodumene |  |  |  |
| Zircon | 15.0 |  | 24.3 |
| Mullite |  | 15.0 |  |
| Properties |  |  |  |
| Resistivity, k$\Omega$/sq. | 97.8 | 183 | 68.6 |
| Stability, thermal shock[2] |  |  |  |
| Stability, dia. scribe[3] |  |  |  |
| Stability, laser scribe[4] | +0.19 | +0.14 | +0.05 |
| Stability, solder dipping[5] | +0.01 | — | +0.08 |

| Example | 28 | 29 | 30 |
|---|---|---|---|
| Glass Binder |  |  |  |
| No. 1 |  | 55.0 |  |
| No. 2 |  |  |  |
| No. 3 |  |  |  |
| No. 4 | 60.0 |  |  |
| No. 5 |  |  |  |
| No. 6 |  |  |  |
| No. 7 |  |  |  |
| No. 8 |  |  |  |
| No. 9 |  |  |  |
| No. 10 |  |  | 61.0 |
| No. 11 |  |  |  |
| Pyrochlore |  |  |  |
| $Bi_2Ru_2O_7$ | 25.0 | 35.0 | 24 |
| $Pb_2Ru_2O_6$ |  |  |  |
| $Pb_{1.5}Bi_{0.5}Ru_2O_{6.25}$ |  |  |  |
| $Gd_{1.23}Bi_{0.77}Ru_2O_7$ |  |  |  |
| $Cu_{0.4}Er_{0.2}Cd_{0.1}Bi_{1.3}Ru_2O_{6.55}$ |  |  |  |
| Fillers |  |  |  |
| Spodumene | 7.5 |  |  |
| Zircon | 7.5 |  | 15.0 |
| Mullite |  | 10.0 |  |
| Properties |  |  |  |
| Resistivity, k$\Omega$/sq. | 15.866 | 1.3 | 150.0 |
| Stability, thermal shock[2] | +0.06 | +0.04 | +0.03 |
| Stability, dia. scribe[3] | Exc. | Exc. | Good |
| Stability, laser scribe[4] |  |  | — |
| Stability, solder dipping[5] | +0.03 | — | +0.04 |

| Example | 31 |
|---|---|
| Glass Binder |  |
| No. 1 |  |
| No. 2 |  |
| No. 3 |  |
| No. 4 |  |
| No. 5 |  |
| No. 6 |  |
| No. 7 |  |
| No. 8 |  |
| No. 9 |  |
| No. 10 |  |
| No. 11 | 46.2 |
| Pyrochlore |  |
| $Bi_2Ru_2O_7$ |  |
| $Pb_2Ru_2O_6$ | 24.4 |
| $Pb_{1.5}Bi_{0.5}Ru_2O_{6.25}$ |  |
| $Gd_{1.23}Bi_{0.77}Ru_2O_7$ |  |
| $Cu_{0.4}Er_{0.2}Cd_{0.1}Bi_{1.3}Ru_2O_{6.55}$ |  |
| Fillers |  |
| Spodumene |  |
| Zircon | 22.2 |
| Mullite |  |
| Properties |  |
| Resistivity, k$\Omega$/sq. | 205 |
| Stability, thermal shock[2] |  |
| Stability, dia. scribe[3] |  |
| Stability, laser scribe[4] | +0.06 |
| Stability, solder dipping[5] | +0.03 |

[1]Examples 14–16 contain 1.5 parts of a TCR driver glass having a composition: $Na_2O$, 7.1; CdO, 60.2; $Al_2O_3$, 2.3; $B_2O_3$, 15.9; $SiO_2$, 14.5 (weight %)
[2]$\Delta R/R_o$ in % after 6 downward shocks from 275 to 25° C.
[3]Time in seconds to come to equilibrium after scribing out half of the resistor width; exc = 0–60 sec; good = 60–180 sec; avg = 180–300 sec; poor is >300 sec
[4]$\Delta R/R_o$ in % after 500-hour storage at room temperature (approximately 23° C.)
[5]$\Delta R/R_o$ in % after two dips in 62 Sn/36 Pb/2 Ag solder at 215° C.

EXAMPLE 32

A control example, outside the scope of the present invention, is prepared from a lead bisilicate glass [containing (weight %) PbO (65), $Al_2O_3$ (1), $SiO_2$ (34) and ground to a surface area of approximately 4.2 m$^2$/g], 76.8 parts; $Bi_2Ru_2O_7$, 23.2 parts; and vehicle (as described for Example 10); the ratio of inorganic solids to vehicle is 71/29.

The composition is printed and the resulting patterns are dried and fired to provide resistors having the following properties:

| resistivity, k$\Omega$/square | : 0.107 |
|---|---|
| stability, thermal shock | : +0.24% |
| stability, diamond scribe | : average |
| stability, solder dipping | : +0.4 |
| stability, laser scribe | : +0.45 |
|  | (500 hours at room temperature) |

As can be seen from the above results, especially the high $\Delta R/R_o$ value for laser scribing, the resistors prepared without the claimed refractory filler, do not exhibit the desired stability to mechanical or thermal stresses.

EXAMPLE 33–37

The resistor compositions in Examples 33–37 are prepared similarly. The process of Examples 10 and 19 is followed. In addition, the following presintering steps are included to obtain presintered functional and filler phase intermediates:

1. Mix dry ingredients together by wet ball milling for two hours;

2. Dry at 150° C. for approximately 16 hours;
3. Break up dried compact (cake) with spatula;
4. Calcine for two hours in Pt-lined boat (temperatures shown in Table VI); in general, for the functional phase intermediate, the temperature range is 700°–850° C., and for the filler phase intermediate, 650°–850° C.;
5. Break up calcined slug in automatic mortar and pestle if necessary;
6. Wet ball milling for 8–16 hours;
7. Vibratory mill for 24–48 hours (24 hours for the filler phase intermediate and 48 hours for the functional phase intermediate); and
8. Dry at 150° C. for approximately 16 hours.

Examples 33–37 and comparative Examples A–E, within the scope of the invention but without the further benefits obtained by presintering, utilize the glasses 1–5 shown in Table V.

TABLE V

| | Glass Binders | | | | | |
|---|---|---|---|---|---|---|
| | 1 | | 2 | | 3 | |
| | Wt. % | Mol % | Wt. % | Mol % | Wt. % | Mol % |
| PbO | 60.15 | 29.6 | 60.96 | 30.24 | 61.79 | 30.90 |
| $SiO_2$ | 32.37 | 59.1 | 32.82 | 60.47 | 33.28 | 61.81 |
| $Al_2O_3$ | 1.19 | 1.29 | 1.19 | 1.29 | 1.18 | 1.29 |
| $B_2O_3$ | 6.33 | 9.99 | 5.03 | 8.0 | 3.75 | 6.00 |

| | 4 | | 5 | |
|---|---|---|---|---|
| | Wt. % | Mol % | Wt. % | Mol % |
| PbO | 62.64 | 31.57 | 63.45 | 52.24 |
| $SiO_2$ | 33.72 | 63.14 | 34.16 | 64.47 |
| $Al_2O_3$ | 1.17 | 1.29 | 1.16 | 1.29 |
| $B_2O_3$ | 2.47 | 4.00 | 1.23 | 2.0 |

The resistor compositions and their fired properties are shown in Table VI.

TABLE VI

| | Example | | |
|---|---|---|---|
| | 33 | 34 | 35 |
| Functional Phase Intermediate | | | |
| Glass no. | 1 | 2 | 3 |
| $Pb_2Ru_2O_6$/Glass ratio (weight) | 1/1 | 1/1 | 1/1 |
| Calcining temp. (°C.) | 700 | 700 | 700 |
| Surface area (m²/g) | 9.9 | 10.5 | 9.8 |
| Filler Phase Intermediate | | | |
| Glass no. | 1 | 2 | 3 |
| $ZrSiO_4$/Glass ratio (weight) | 1/1 | 1/1 | 1/1 |
| Calcining temp. (°C.) | 650 | 700 | 700 |
| Surface Area (m²/g) | 10–12 | 10.5 | 9.2 |
| Paste Formulation | | | |
| Functional Phase (weight %) | 40 | 35 | 35 |
| Filler Phase (weight %) | 30 | 32 | 29 |
| TCR Driver[1] (weight %) | — | 3 | 6 |
| Vehicle[2] (weight %) | 30 | 30 | 30 |
| Properties | | | |
| Resistivity, KΩ/square | 71 | 103 | 69 |
| HTCR, ppm/°C. | +197 | +64 | +68 |
| Stability, laser scribe[3] | | | |
| 23° C. | −.04 | .05 | .08 |
| 40° C./85% rel. humidity | −.01 | .08 | .13 |
| 200° C. | +.09 | .25 | .19 |
| Stability, solder dipping[4] (after one immersion) | — | .04 | .04 |

| | Example | |
|---|---|---|
| | 36 | 37 |
| Functional Phase Intermediate | | |
| Glass no. | 4 | 5 |
| $Pb_2Ru_2O_6$/Glass ratio (weight) | 1/1 | 1/1 |

TABLE VI-continued

| Calcining temp. (°C.) | 700 | 700 |
|---|---|---|
| Surface area (m²/g) | 9.9 | 10.1 |
| Filler Phase Intermediate | | |
| Glass no. | 4 | 5 |
| $ZrSiO_4$/Glass ratio (weight) | 1/1 | 1/1 |
| Calcining temp. (°C.) | 700 | 700 |
| Surface Area (m²/g) | 9.1 | 9.4 |
| Paste Formulation | | |
| Functional Phase (weight %) | 35 | 35 |
| Filler Phase (weight %) | 29 | 29 |
| TCR Driver[1] (weight %) | 6 | 6 |
| Vehicle[2] (weight %) | 30 | 30 |
| Properties | | |
| Resistivity, KΩ/square | 76 | 76 |
| HTCR, ppm/°C. | +27 | +3 |
| Stability, laser scribe[3] | | |
| 23° C. | .07 | .06 |
| 40° C./85% rel. humidity | .11 | .13 |
| 200° C. | | |
| Stability, solder dipping[4] (after one immersion) | .03 | .06 |

[1]TCR glass having the composition: $Al_2O_3$, 4.06; $MnO_2$, 6.44; $B_2O_3$, 1.41; $SiO_2$, 25.2; PbO, 50.2 (weight %)
[2]Vehicle as in Example 10
[3]$\Delta R/R_o$ in % after 400–500-hour storage at the indicated conditions.
[4]$\Delta R/R_o$ in % in 62 Sn/36 Pb/2 Ag solder at 215° C.

Comparative Examples A–E, compositions and properties shown in Table VII, are prepared as in Examples 10 and 19 and are comparable to Examples 33–37, respectively, but without the benefit of presintering.

The data indicate that post-laser trim stability at room temperature storage does not require presintering; further benefits for higher temperature storage can be derived from the present invention when presintering of ingredients is carried out.

TABLE VII

| | Example | | |
|---|---|---|---|
| | A | B | C |
| $Pb_2Ru_2O_6$ | 20.0 | 19.6 | 19.6 |
| Glass no. 1 | 39.3 | — | — |
| 2 | — | 38.7 | — |
| 3 | — | — | 38.7 |
| 4 | — | — | — |
| 5 | — | — | — |
| $ZrSiO_4$ | 10.5 | 10.3 | 10.3 |
| TCR Driver[1] | — | 2.0 | 2.0 |
| Properties | | | |
| Resistivity, KΩ/square | 156 | 59 | 109 |
| HTCR | +328 | +265 | +185 |
| Stability, laser scribe | | | |
| $\Delta R/R_o$ (%) after 124 hrs. | | | |
| 23° C. | — | .47 | .18 |
| 40° C./85% R.H. | — | .25 | .27 |
| 200° C. | — | .47 | .56 |
| $\Delta R/R_o$ (%) after 500 hrs. | | | |
| 23° C. | 0.05 | — | — |
| 40° C./85% R.H. | 0.24 | — | — |
| 200° C. | 0.57 | — | — |
| Stability, solder dipping | .10 | .22 | .17 |

| | Example | |
|---|---|---|
| | D | E |
| $Pb_2Ru_2O_6$ | 19.6 | 19.6 |
| Glass no. 1 | — | — |
| 2 | — | — |
| 3 | — | — |
| 4 | 38.7 | — |
| 5 | — | 38.7 |
| $ZrSiO_4$ | 10.3 | 10.3 |
| TCR Driver[1] | 2.0 | 2.0 |
| Properties | | |
| Resistivity, KΩ/square | 105 | 128 |
| HTCR | +164 | +137 |

TABLE VII-continued

| | | |
|---|---|---|
| Stability, laser scribe | | |
| $\Delta R/R_o$ (%) after 124 hrs. | | |
| 23° C. | .14 | .10 |
| 40° C./85% R.H. | .21 | .20 |
| 200° C. | .70 | .76 |
| $\Delta R/R_o$ (%) after 500 hrs. | | |
| 23° C. | — | — |
| 40° C./85% R.H. | — | — |
| 200° C. | — | — |
| Stability, solder dipping | .13 | .11 |

(1) TCR driver used is described in footnote 1 after Table IV

EXAMPLES 38–46

These Examples are carried out as in Examples 33–37, utilizing glasses 3 and 4 from Table V. The resistor compositions are formulated to have varying resistance values. Table VIII summarizes the data; the footnotes are the same as for Table VI.

TABLE VIII

| | Example | | |
|---|---|---|---|
| | 38 | 39 | 40 |
| Functional Phase Intermediate | | | |
| Glass no. | 4 | 4 | 4 |
| $Pb_2Ru_2O_6$/Glass ratio (weight) | 1/1 | 1/1 | 1/1 |
| Calcining temp. (°C.) | 700 | 700 | 700 |
| Surface area (m²/g) | 9.9 | 9.9 | 9.9 |
| Filler Phase Intermediate | | | |
| Glass no. | 4 | 4 | 4 |
| $ZrSiO_4$/Glass ratio (weight) | 1/1 | 1/1 | 1/1 |
| Calcining temp. (°C.) | 700 | 700 | 700 |
| Surface Area (m²/g) | 9.1 | 9.1 | 9.1 |
| Paste Formulation | | | |
| Functional Phase (weight %) | 30 | 33 | 40 |
| Filler Phase (weight %) | 40 | 33 | 24 |
| TCR Driver(1) (weight %) | — | 4 | 6 |
| Vehicle(2) (weight %) | 30 | 30 | 30 |
| Properties | | | |
| Resistivity, KΩ/square | 341 | 147 | 28 |
| HTCR, ppm/°C. | +160 | +61 | +90 |
| Stability, laser scribe(3) | | | |
| 23° C. | .10 | .10 | .09 |
| 40° C./85% rel. humidity | .12 | .10 | .11 |
| 200° C. | .91 | .28 | .31 |
| Stability, solder dipping(4) (after one immersion) | .02 | .05 | .08 |

| | Example | | |
|---|---|---|---|
| | 41 | 42 | 43 |
| Functional Phase Intermediate | | | |
| Glass no. | 4 | 4 | 3 |
| $Pb_2Ru_2O_6$/Glass ratio (weight) | 1/1 | 1/1 | 1/1 |
| Calcining temp. (°C.) | 700 | 700 | 700 |
| Surface area (m²/g) | 9.9 | 9.9 | 9.8 |
| Filler Phase Intermediate | | | |
| Glass no. | 4 | 4 | 3 |
| $ZrSiO_4$/Glass ratio (weight) | 1/1 | 1/1 | 1/1 |
| Calcining temp. (°C.) | 700 | 700 | 700 |
| Surface Area (m²/g) | 9.1 | 9.1 | 9.2 |
| Paste Formulation | | | |
| Functional Phase (weight %) | 44 | 28 | 30 |
| Filler Phase (weight %) | 20 | 39 | 40 |
| TCR Driver(1) (weight %) | 6 | 3 | — |
| Vehicle(2) (weight %) | 30 | 30 | 30 |
| Properties | | | |
| Resistivity, KΩ/square | 17 | 1371 | 456 |
| HTCR, ppm/°C. | °105 | −30 | +141 |
| Stability, laser scribe(3) | | | |
| 23° C. | .07 | .07 | .09 |
| 40° C./85% rel. humidity | .10 | .17 | .15 |
| 200° C. | .40 | .40 | .73 |
| Stability, solder dipping(4) (after one immersion) | .10 | .08 | .09 |

| | Example | | |
|---|---|---|---|
| | 44 | 45 | 46 |
| Functional Phase Intermediate | | | |
| Glass no. | 3 | 3 | 3 |
| $Pb_2Ru_2O_6$/Glass ratio (weight) | 1/1 | 1/1 | 1/1 |
| Calcining temp. (°C.) | 700 | 700 | 700 |
| Surface area (m²/g) | 9.8 | 9.8 | 9.8 |
| Filler Phase Intermediate | | | |
| Glass no. | 3 | 3 | 3 |
| $ZrSiO_4$/Glass ratio (weight) | 1/1 | 1/1 | 1/1 |
| Calcining temp. (°C.) | 700 | 700 | 700 |
| Surface Area (m²/g) | 9.2 | 9.2 | 9.2 |
| Paste Formulation | | | |
| Functional Phase (weight %) | 33 | 44 | 29 |
| Filler Phase (weight) % | | | |
| TCR Driver(1) (weight %) | 4 | 6 | 2 |
| Vehicle(2) (weight %) | 30 | 30 | 30 |
| Properties | | | |
| Resistivity, KΩ/square | 151 | 16 | 1002 |
| HTCR, ppm/°C. | +70 | +159 | +58 |
| Stability, laser scribe(3) | | | |
| 23° C. | .09 .10 | .22 | |
| 40° C./85% rel. humidity | .12 .13 | .26 | |
| 200° C. | .24 | .35 | .58 |
| Stability, solder dipping(4) (after one immersion) | .08 | .12 | .23 |

EXAMPLES 47–48

The current best mode contemplated for carrying out the invention is shown by Example 47; both of these Examples utilize a currently preferred glass binder, 6, having the following composition:

| | Wt. % | Mole % |
|---|---|---|
| PbO | 62.17 | 31.2 |
| $SiO_2$ | 33.53 | 62.5 |
| $Al_2O_3$ | 1.19 | 1.30 |
| $B_2O_3$ | 3.11 | 5.00 |

These compositions are prepared as shown for Examples 33–37, the data are shown in Table IX; the footnotes are the same as for Table VI.

TABLE IX

| | Example | |
|---|---|---|
| | 47 | 48 |
| Functional Phase Intermediate | | |
| Glass no. | 6 | 6 |
| $Pb_2Ru_2O_6$/Glass ratio (weight) | 1/1 | 1/1 |
| Calcining temp. (°C.) | 700 | 700 |
| Surface area (m²/g) | 9.2 | 9.2 |
| Filler Phase Intermediate | | |
| Glass no. | 7 | 7 |
| $ZrSiO_4$/Glass ratio (weight) | 1/1 | 1/1 |
| Calcining temp. (°C.) | 650 | 650 |
| Surface Area (m²/g) | 10.0 | 10.0 |
| Paste Formulation | | |
| Functional Phase (weight %) | 34 | 29 |
| Filler Phase (weight %) | 31 | 39 |
| TCR Driver(1) (weight %) | 5 | 2 |
| Vehicle(2) (weight %) | 30 | 30 |
| Properties | | |
| Resistivity, KΩ/square | 205 | 2912 |

TABLE IX-continued

| | Example | |
|---|---|---|
| Functional Phase Intermediate | 47 | 48 |
| HTCR, ppm/°C. | +25 | −2 |
| Stability, laser scribe[3] | | |
| 23° C. | .06 | .12 |
| 40° C./85% rel. humidity | .15 | .07 |
| 200° C. | .08 | .35 |
| Stability, solder dipping[4] | | |
| (after one immersion) | .03 | — |

We claim:

1. A thick film resistor composition consisting essentially of:
   (A) 20–75 parts by weight, based on the weight of (A) plus (B) plus (C), of a conductive pyrochlore having the general formula $(M_xBi_{2-x})(M'_yM\Delta_{2-y})O_{7-z}$ wherein
   M is selected from the group consisting of yttrium, thallium, indium, cadmium, lead, copper and the rare earth metals;
   M' is selected from the group consisting of platinum, titanium, chromium, rhodium and antimony;
   M'' is ruthenium, iridium or mixtures thereof;
   x is 0–2 with the proviso that, for monovalent copper, $x \leq 1$;
   y is 0–0.5 with the proviso that y is 0–1 when M' is either rhodium or more than one of platinum, titanium, chromium, rhodium and antimony; and
   z is 0–1 with the proviso that it is at least equal to approximately x/2 when M is divalent lead or cadmium;
   (B) 12–75 parts by weight, based on the weight of (A) plus (B) plus (C), of a glass binder having a coefficient of thermal expansion range of approximately $50-90 \times 10^{-7}/°$ C. and a coalescence temperature range of approximately 540°–950° C.;
   (C) 2–30 parts by weight, based on the weight of (A) plus (B) plus (C), of a refractory finely divided filler having a low solution rate in the glass binder, a coefficient of thermal expansion range of approximately $40-60 \times 10^{-7}/°$ C. and a particle size range of 0.1–3 nm with at least 90% by weight in the 0.3–1 nm range; and
   (D) an organic vehicle wherein the ratio of (A) plus (B) plus (C) to the vehicle is in the range of 2:1 to 6:1 by weight.

2. The resistor composition of claim 1 wherein y=0.

3. The resistor composition of claim 2 wherein the conductive pyrochlore is selected from the group consisting of bismuth ruthenate and lead ruthenate.

4. The resistor composition of claim 1 wherein the glass binder has a coefficient of thermal expansion range of $55-80 \times 10^{-7}/°$ C. and a coalescence temperature range of 750°–925° C.

5. The resistor composition of claim 3 wherein the glass binder comprises 23–34 percent by weight of $SiO_2$ and 52–73 percent by weight of PbO.

6. The resistor composition of claim 5 wherein the refractory filler is zircon.

7. The composition of claim 1 wherein the glass binder is a lead borosilicate glass and the glass additionally contains up to 3 percent by weight of $Li_2O$.

8. The composition of claim 1 wherein the glass binder is a borosilicate glass and the glass additionally contains $Na_2O$.

9. The composition of claim 1 wherein the refractory filler is selected from the group consisting of zircon and mullite.

10. A thick film resistor composition consisting essentially of:
    (A) 23–70 parts by weight, based on the weight of (A) plus (B) plus (C), of a conductive pyrochlore having the general formula $(M_xBi_{2-x})(M'_yM''_{2-y})O_{7-z}$ wherein
    M is selected from the group consisting of yttrium, thallium, indium, cadmium, lead, copper and the rare earth metals;
    M' is selected from the group consisting of platinum, titanium, chromium, rhodium and antimony;
    M'' is ruthenium, iridium or mixtures thereof;
    x is 0–2 with the proviso that, for monovalent copper, $x \leq 1$;
    y is 0–0.5 with the proviso that y is 0–1 when M' is either rhodium or more than one of platinum, titanium, chromium, rhodium and antimony; and
    z is 0–1 with the proviso that it is at least equal to approximately x/2 when M is divalent lead or cadmium;
    (B) 28–65 parts by weight, based on the weight of (A) plus (B) plus (C), of a glass binder having a coefficient of thermal expansion range of approximately $50-90 \times 10^{-7}/°$ C. and a coalescence temperature range of approximately 540°–950° C.;
    (C) 2–30 parts by weight, based on the weight of (A) plus (B) plus (C), of a refractory finely divided filler having a low solution rate in the glass binder, a coefficient of thermal expansion range of approximately $40-60 \times 10^{-7}/°$ C. and a particle size range of 0.1–3 nm with at least 90% by weight in the 0.3–1 nm range; and
    (D) an organic vehicle wherein the ratio of (A) plus (B) plus (C) to the vehicle is in the range of 2:1 to 6:1 by weight.

11. A thick film resistor composition consisting essentially of:
    (A) 23–70 parts by weight, based on the weight of (A) plus (B) plus (C), of a conductive pyrochlore having the general formula $(M_xBi_{2-x})M''_2O_{7=z}$ wherein
    M is selected from the group consisting of yttrium, thallium, indium, cadmium, lead, copper and the rare earth metals;
    M'' is ruthenium, iridium or mixtures thereof;
    x is 0–2 with the proviso that, for monovalent copper, $x \leq 1$;
    z is 0–1 with the proviso that it is at least equal to approximately x/2 when M is divalent lead or cadmium;
    (B) 28–65 parts by weight, based on the weight of (A) plus (B) plus (C), of a glass binder having a coefficient of thermal expansion range of approximately $50-90 \times 10^{-7}/°$ C. and a coalescence temperature range of approximately 540°–950° C.;

(C) 2-30 parts by weight, based on the weight of (A) plus (B) plus (C), of a refractory finely divided filler having a low solution rage in the glass binder, a coefficient of thermal expansion range of approximately 40-60×10$^{-7}$/° C. and a particle size range of 0.1-3 nm with at least 90% by weight in the 0.3-1 nm range; and (D) an organic vehicle wherein the ratio of (A) plus (B) plus (C) to the vehicle is in the range of 2:1 to 6:1 by weight.

12. The resistor composition of claim 11 wherein the conductive pyrochlore is selected from the group consisting of bismuth ruthenate and lead ruthenate.

13. The resistor composition of claim 11 wherein the glass binder has a coefficient of thermal expansion range of 55-80×10$^{-7}$/° C. and a coalescence temperature range of 750°-925° C.

14. The resistor composition of claim 11 wherein the glass binder comprises 23-34 percent by weight of silica and 52-73 percent by weight of PbO.

15. The resistor composition of claim 12 wherein the refractory filler is zircon.

16. A thick film resistor composition consisting essentially of:

(A) approximately 25.5 parts by weight, based on the weight of (A) plus (B) plus (C), of bismuth ruthenate;

(B) approximately 59.5 parts by weight, based on the weight of (A) plus (B) plus (C), of a glass binder comprising 23-34 percent by weight of the binder of silica and 52-73 percent by weight of the binder of PbO;

(C) approximately 15 parts by weight, based on the weight of (A) plus (B) plus (C), of zircon; and (D) organic vehicle based on ethyl cellulose in a weight ratio to the sum of (A) plus (B) plus (C) of 1:3.

17. A thick film resistor composition consisting essentially of:

(A) approximately 25.4 parts by weight, based on the weight of (A) plus (B) plus (C), of lead ruthenate;

(B) approximately 59.6 parts by weight, based on the weight of (A) plus (B) plus (C), of a glass binder comprising 23-34 percent by weight of the binder of silica and 52-73 percent by weight of the binder of PbO;

(C) approximately 15 parts by weight, based on the weight of (A) plus (B) plus (C), of zircon; and (D) organic vehicle based on ethyl cellulose in a weight ratio to the sum of (A) plus (B) plus (C) of 1:3.

18. A thick film resistor composition consisting essentially of:

(A) 20-75 parts by weight, based on the weight of (A) plus (B) plus (C), of a conductive pyrochlore having the general formula $$(M_xBi_{2-x})M'_yM''_{2-y}O_{7-z}$$

wherein
M is selected from the group consisting of yttrium, thallium, indium, cadmium, lead, copper and the rare earth metals;
M' is selected from the group consisting of platinum, titanium, chromium, rhodium and antimony;
M'' is ruthenium, iridium or mixtures thereof;
x is 0-2 with the proviso that, for monovalent copper, $x \leq 1$;
y is 0-0.5 with the proviso that y is 0-1 when M' is either rhodium or more than one of platinum, titanium, chromium, rhodium and antimony; and
z is 0-1 with the proviso that it is at least equal to approximately x/2 when M is divalent lead or cadmium (B) 12-75 parts by weight, based on the weight of (A) plus (B) plus (C), of a glass binder having a coefficient of thermal expansion range of approximately 50-90×10$^{-7}$/° C. and a coalescence temperature range of approximately 540°-950° C.;

(C) 2-30 parts by weight, based on the weight of (A) plus (B) plus (C), of a refractory finely divided filler having a low solution rate in the glass binder, a coefficient of thermal expansion range of approximately 40-60×10$^{-7}$/° C. and a particle size range of 0.1-3 nm with at least 90% by weight in the 0.3-1 nm range;

wherein portions of pyrochlore (A), glass binder (B) and refractory filler (C) are presintered in various combinations; and (D) an organic vehicle wherein the ratio of (A) plus (B) plus (C) to the vehicle is in the range of 2:1 to 6:1 by weight.

19. The composition of claim 18 wherein portions of glass binder (B) are presintered with a portion of pyrochlore (A) and a portion of refractory filler (C).

20. The composition of claim 19 wherein the presintering of glass binder (B) and pyrochlore (A) is carried out in the temperature range of 700°-850° C. and the presintering of glass binder (B) and refractory filler (C) is carried out in the temperature range of 650°-850° C.

* * * * *

UNITED STATES PATENT OFFICE
CERTIFICATE OF CORRECTION

PATENT NO. : 4,302,362
DATED : November 24, 1981
INVENTOR(S) : Lewis C. Hoffman & Samuel J. Horowicz It is certified that error appears in the above-identified patent and that said Letters Patent are hereby corrected as shown below:

Claim 1, column 19, line 18, "MΔ" should be --M"--;

Signed and Sealed this

Twentieth Day of April 1982

[SEAL]

Attest:

Attesting Officer

GERALD J. MOSSINGHOFF

Commissioner of Patents and Trademarks